(12) United States Patent
Kawai et al.

(10) Patent No.: US 6,952,961 B2
(45) Date of Patent: Oct. 11, 2005

(54) AIR FLOW RATE MEASURING DEVICE (75) Inventors: Masahiro Kawai, Tokyo (JP);
Fumiyoshi Yonezawa, Tokyo (JP);
Akira Takashima, Tokyo (JP);
Hiroyuki Uramachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/820,772

(22) Filed: Apr. 9, 2004

(65) Prior Publication Data
US 2005/0150290 A1    Jul. 14, 2005

(30) Foreign Application Priority Data
Jan. 13, 2004  (JP) .............................. 2004-005913

(51) Int. Cl.[7] .............................................. G01F 1/68
(52) U.S. Cl. ................................................. 73/204.22
(58) Field of Search .................... 73/202.5, 204.11, 73/204.22, 204.25, 204.26

(56) References Cited

U.S. PATENT DOCUMENTS 6,640,627 B2 *  11/2003  Sato et al. ............... 73/204.22

FOREIGN PATENT DOCUMENTS

| JP | 06-050783 A | 2/1994 |
|----|-------------|--------|
| JP | 3323745 B2 | 2/1998 |
| JP | 2003-035578 A | 2/2003 |

* cited by examiner

Primary Examiner—Edward Lefkowitz
Assistant Examiner—Corey D. Mack
(74) Attorney, Agent, or Firm—Sughrue Mion, PLLC (57)  ABSTRACT

An air flow rate measuring device serves to measure a flow rate of air flowing through a main passage inside an intake pipe of an engine. A base has its one end directed axially of the main passage toward an upstream side of air flowing therein, and its other end directed toward a downstream side thereof, with a bent groove being formed in the base. A circuit module includes a support substrate and a detection element installed one surface of the support substrate for detecting the flow rate of air, the module being joined to the base in a face-to-face relation with respect to each other to form an auxiliary passage in cooperation with the groove. The detection element on the one surface of the support substrate is exposed to air in the auxiliary passage, and the other surface of the support substrate is exposed to air in the main passage.

5 Claims, 7 Drawing Sheets

AIR FLOW RATE MEASURING DEVICE

BACKGROUND OF THE INVENTION

1. Field of the Invention

The present invention relates to an air flow rate measuring device mounted on an intake pipe of an internal combustion engine for measuring the flow rate of air flowing through a main passage inside the intake pipe.

2. Description of the Related Art

In the past, an air flow rate measuring device is used to measure the flow rate of air flowing through a main passage of an intake pipe of an internal combustion engine, and in recent years, demands have been made for improvements in the accuracy of measurements in a low flow rate range as well as at the time of transition in accordance with an increased range of intake flow rate measurements accompanying the increased output power of the internal combustion engine and the tightening of emission control.

As one example of such an air flow rate measuring device, the one described in a first patent document (Japanese patent application laid-open No. 2003-35578) for example includes a flow rate detection element and electronic circuit parts which are mounted on a rectangular-shaped support substrate made of a ceramic material or the like at positions different from one another in the longitudinal direction thereof. In addition, it also includes a housing in which electronic circuits implemented on the support substrate are received, a flow conduit in which coolant or cooling fluid is caused to pass in the primary direction of flow in a main passage so as to cool the support substrate, and an auxiliary flow conduit with auxiliary passages through which the cooling fluid is caused to flow in a direction opposite the primary direction and in which the above-mentioned flow rate detection element is arranged.

In such a known air flow rate measuring device, the support substrate is held in the central portion of the auxiliary passage. Accordingly, there arises a problem that positional displacements and/or angular deviations of the support substrate with respect to the flow of air can be caused easily, resulting in reduction in the accuracy of measurements.

Moreover, component parts for holding the flow rate detection element in position and component parts for forming a passage to introduce air into the flow rate detection element are required individually and separately, thus posing another problem. That is, the number of parts required is increased and hence the assembly man-hour required accordingly becomes a lot, and the accuracy of measurements is reduced owing to dimensional variations and assembly variations of the parts.

Furthermore, since the support substrate with the flow rate detection element mounted thereon is arranged in the central portion of the auxiliary passage, there is an additional problem, too, in that the pressure loss in the auxiliary passage is increased by the support substrate.

SUMMARY OF THE INVENTION

Accordingly, the present invention is intended to obviate the above-mentioned various problems, and has for its object to obtain an air flow rate measuring device in which the pressure loss can be reduced, accuracy in the mounting position of a detection element can be improved, and the number of parts required can be decreased to reduce assembly variations of the respective parts with resultant improvements in the accuracy of measurements.

Bearing the above object in mind, according to the present invention, there is provided an air flow rate measuring device adapted to be mounted on an intake pipe of an internal combustion engine for measuring a flow rate of air flowing through a main passage inside the intake pipe. The device includes a base having its one end directed along an axial direction of the main passage toward an upstream side of air flowing therein, and its other end directed toward a downstream side of the air, the base being formed with a groove which is bent at a location between the opposite ends thereof. The device further includes a circuit module having a support substrate and a detection element installed one surface of the support substrate for detecting the flow rate of air, the module being joined to the base in a face-to-face relation with respect to each other to form an auxiliary passage in cooperation with the groove. The detection element on the one surface of the support substrate is exposed to air in the auxiliary passage, and the other surface of the support substrate is exposed to air in the main passage.

The following advantageous effects are achieved according to the air flow rate measuring device of the present invention. Since the support substrate having the detection element mounted thereon serves to constitute a part of the auxiliary passage, it is possible not only to reduce the pressure loss but also to improve accuracy in the mounting position of the detection element. In addition, the number of component parts can be reduced, thereby making it possible to reduce assembly variations of the respective parts. As a result, the accuracy of measurements can be improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout the following embodiments and illustrated figures of the present invention, the same or corresponding members or parts as those in the aforementioned known device are identified by the same symbols.

Embodiment 1.

Now, a first embodiment of the present invention will be described below in detail.

Figure 1:
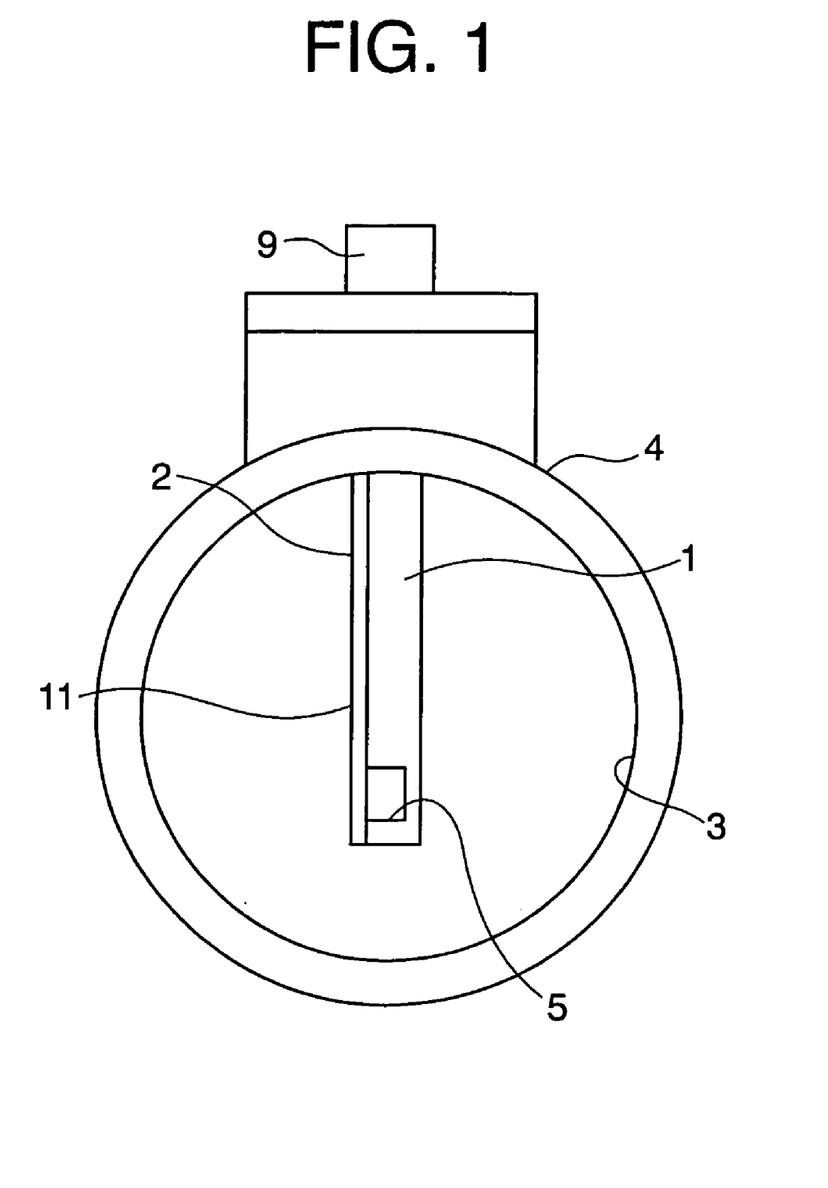
FIG. 1 is a front elevational view showing an air flow rate measuring device according to a first embodiment of the present invention.
Figure 2:
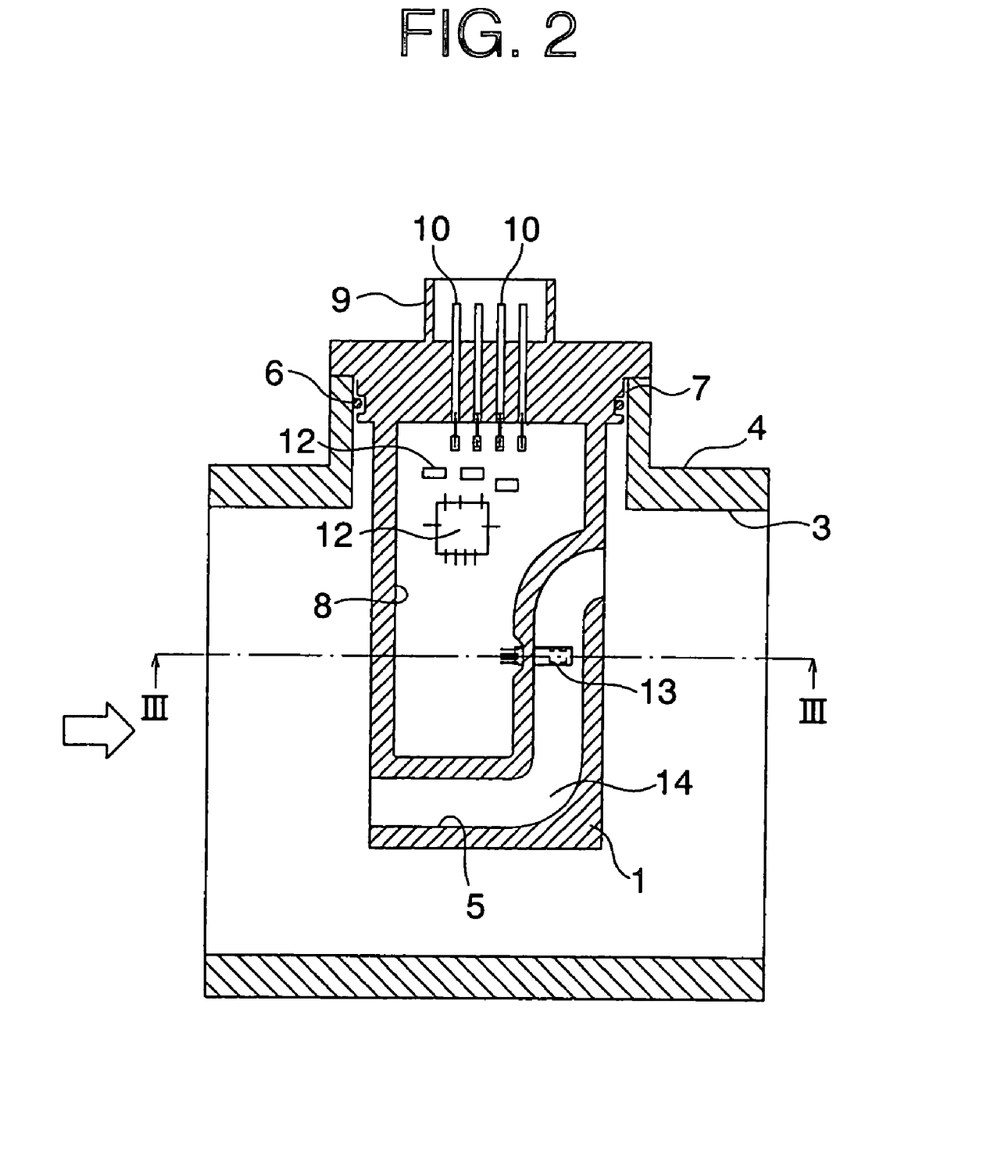
FIG. 2 is a cross sectional side elevational view of FIG. 1.
Figure 3:
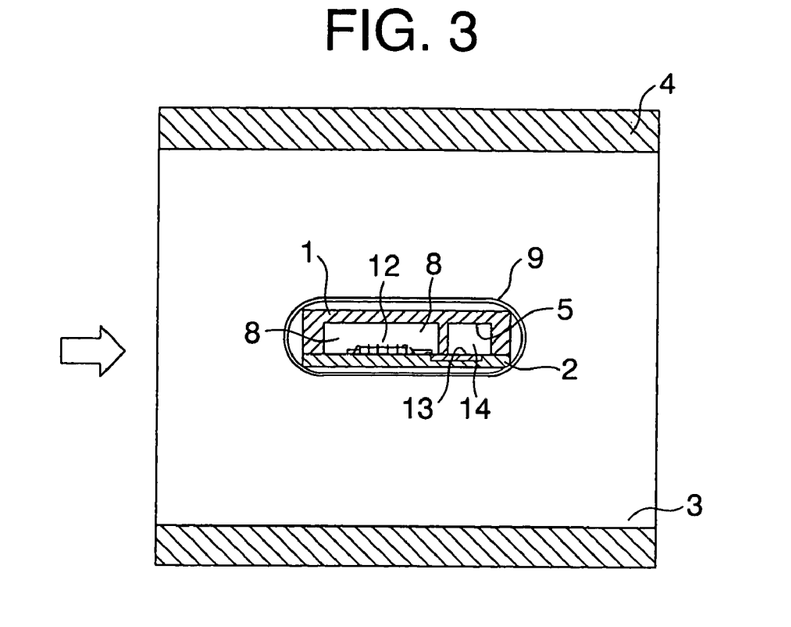
FIG. 3 is a cross sectional arrow view along line III—III of FIG. 2.

FIG. 1 is a front elevational view that shows an air flow rate measuring device according to a first embodiment of the present invention. FIG. 2 is a cross sectional side elevational view of FIG. 1, and FIG. 3 is a cross sectional arrow view along line III—III of FIG. 2.

This air flow rate measuring device includes a rectangle-shaped base 1 mounted on an intake pipe 4 having a main passage 3 defined therein, and a circuit module 2 joined to the base 1 in a face-to-face relation with respect to each other.

The base 1 is formed with a groove 5 that has one end thereof directed along an axial direction of the main passage 3 toward an upstream side of air therein, and the other end directed toward a downstream side of the air, the groove 5 being bent into the shape of the letter L at a location between the opposite ends thereof. Each of corners in the groove 5 is shaped into a curved surface so as to guide the flow of air in a smooth manner. Also, the base 1 has a chamber 8 defined therein in addition to the groove 5. The base 1 is provided continuously or integrally with a connector 9 that has terminals 10 built therein by insert molding. An O ring 6 is fitted over the connector 9 for providing a seal around a mounting hole 7 formed through the intake pipe 4 with respect to the periphery of the connector 9.

Figure 4:
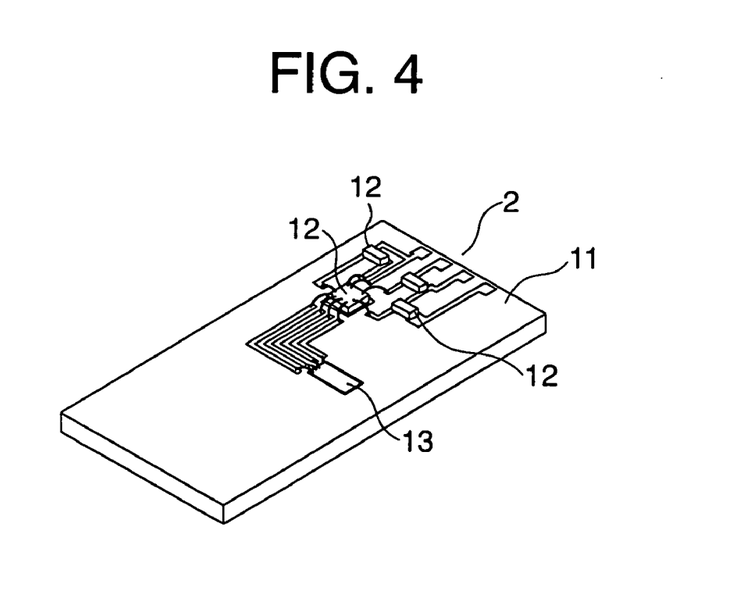
FIG. 4 is an overall perspective view showing a circuit module of FIG. 1.

As shown in FIG. 4, the circuit module 2 includes a support substrate 11 made of a ceramic material or a glass epoxy material with conductor patterns being formed thereon by printing, various electronic parts 12 mounted on one surface of the support substrate 11, and a detection element in the form of a thermo-sensitive resistance element 13 electrically connected to the electronic parts 12 for detecting the flow rate of air passing through the main passage 3 defined in the intake pipe 4. The thermo-sensitive resistance element 13 is fabricated, for example, by first forming a thin film heater element on a front or principal surface of a silicon substrate, and then removing a part of a rear surface thereof by etching. The thermo-sensitive resistance element 13 is mounted on the support substrate 11 by being fitted into a concave portion formed in one surface of the support substrate 11 so as to be flush therewith.

The circuit module 2 is joined to the base 1 in a face-to-face relation with respect to each other, with the respective electronic parts 12 being received in the chamber 8. An auxiliary passage 14 is defined by the groove 5 in the base 1 and the one surface of the support substrate 11, and the thermo-sensitive resistance element 13 is arranged in such a manner that it is exposed to air in the auxiliary passage 14. The other side of the support substrate 11 is exposed to air in the main passage 3.

Here, note that the auxiliary passage 14 is provided for the following reason.

That is, though a pulsating flow of intake air is generated in accordance with the operating condition of the internal combustion engine, there is a nonlinear relation between the output of the thermo-sensitive resistance element 13 and the air flow rate, and the thermo-sensitive resistance element 13 has a thermal delay. Therefore, the average value of a flow rate detection signal, which is obtained by successively converting the output from the thermo-sensitive resistance element 13 into the corresponding air flow rate, becomes smaller than the flow rate of the air that is actually flowing through the main passage 3. In order to eliminate such a inconvenience, the length of the auxiliary passage 14 with the thermo-sensitive resistance element 13 installed therein is made greater than the length of the main passage 3 thereby to increase the inertia of the air flow in the auxiliary passage 14, whereby the average flow rate of air in the auxiliary passage 14 can be increased to a value greater than the flow rate of air in the main passage 3. As a result, reduction in the average value of the flow rate detection signal, which is lower than the actual flow rate of the air flowing through the main passage 3, can be supplemented. In addition, the auxiliary passage 14 serves to suppress the pulsation of air flowing therein, and has a flow regulating or straightening function.

According to the air flow rate measuring device as constructed above, the thermo-sensitive resistance element 13 is mounted in advance on the support substrate 11 that constitutes a part of the auxiliary passage 14, so that the position of the thermo-sensitive resistance element 13 arranged in the auxiliary passage 14 is determined by mounting the support substrate 11 to the base 1. Accordingly, assembly of these components becomes easy, and the thermo-sensitive resistance element 13 is placed at a prescribed position in the auxiliary passage 14 in an easy and simple manner.

Moreover, the thermo-sensitive resistance element 13 is mounted to the wall of the auxiliary passage 14, so that it can measure the velocity of flow of air at a location where the flow velocity is slow in the auxiliary passage 14. Thus, the speed of dust dispersing in the air is slow, as a result of which the energy generated when the dust collides with the thermo-sensitive resistance element 13 is low, and hence the thermo-sensitive resistance element 13 is not liable to be damaged.

Further, since the thermo-sensitive resistance element 13 is arranged flush with the surface of the support substrate 11, the turbulence of the air flow resulting from irregularities in the neighborhood of the thermo-sensitive resistance element 13 and the deposition of dust on the surface of the thermo-sensitive resistance element 13 are prevented, thereby making it possible to stabilize the accuracy of measurement and detection.

The inventor actually carried out measurements of the air flow rate for comparison between the air flow rate measuring device of the first embodiment (the example of the first embodiment) and that of the first patent document (the prior art example).

Figure 5:
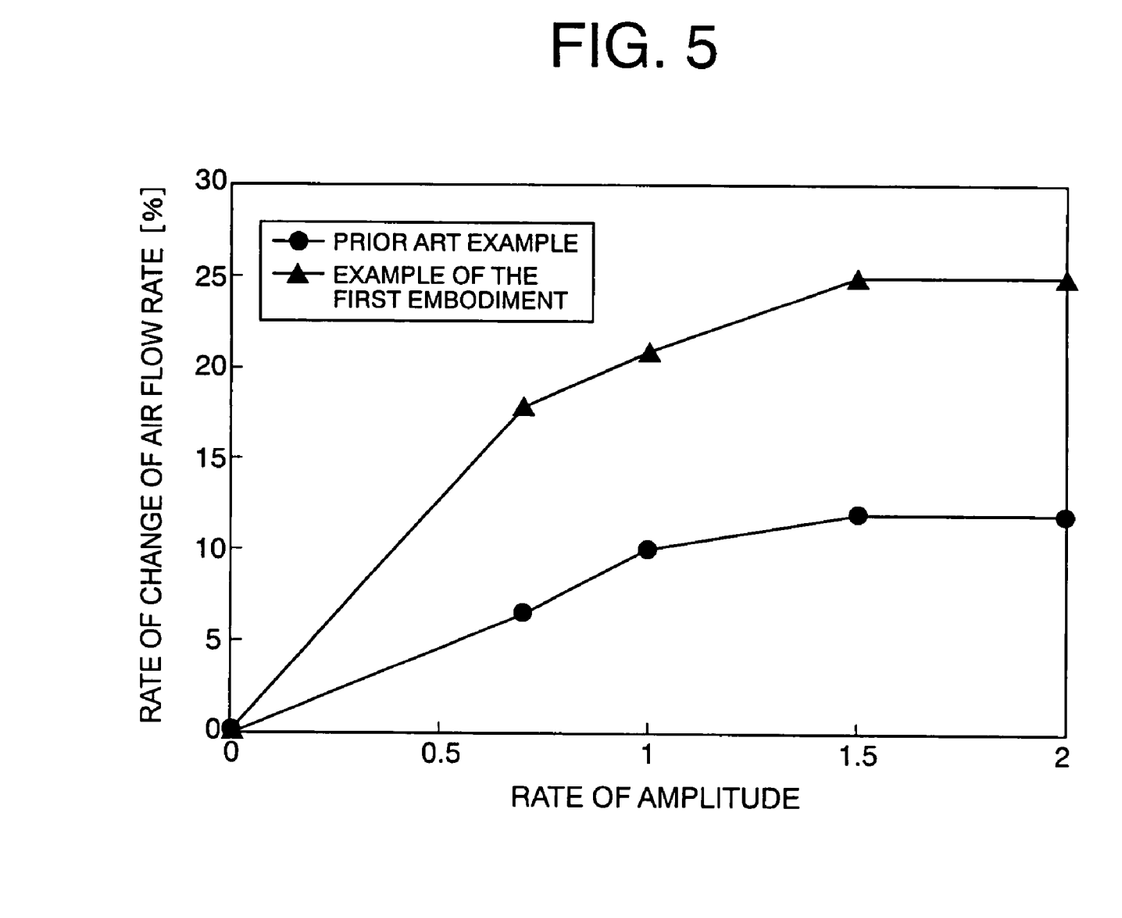
FIG. 5 is a view showing the relation between the rate of the amplitude of air and the rate of change of an air flow.
Figure 6:
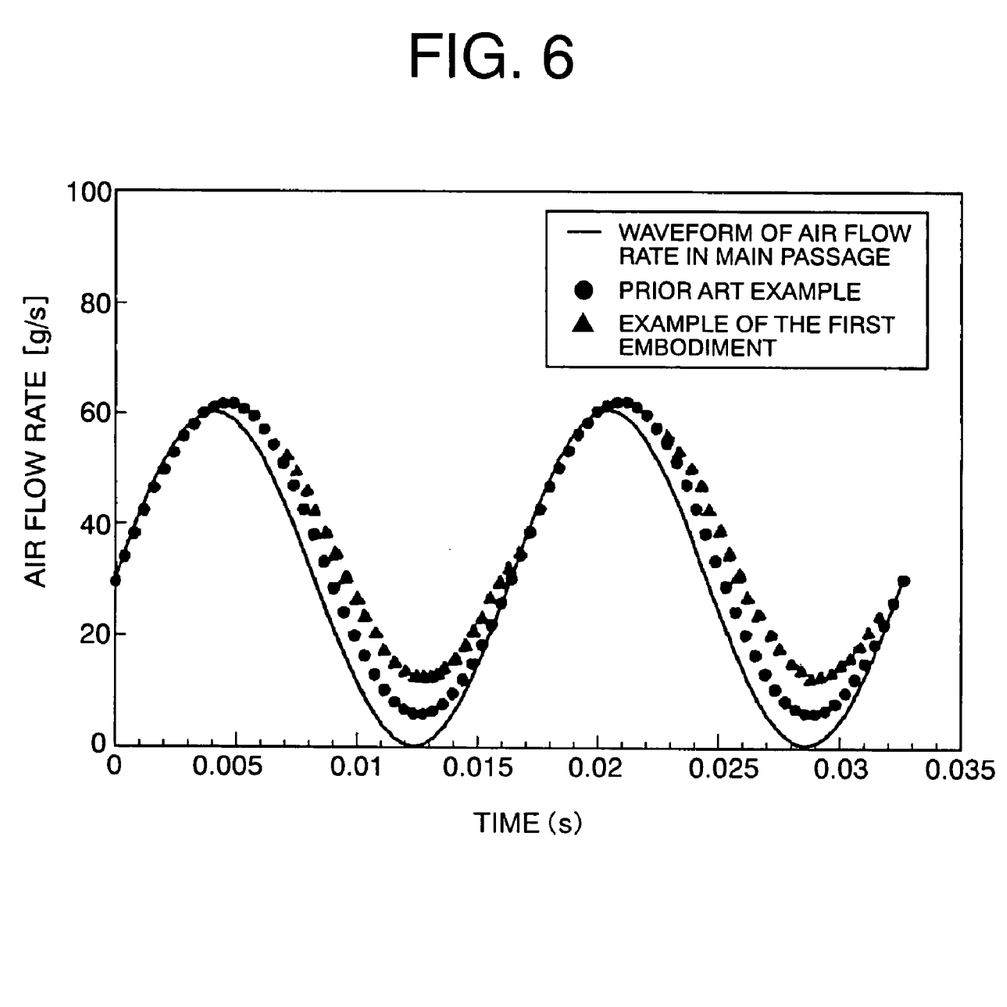
FIG. 6 is a view showing the waveform of the air flow at a rate of amplitude of 1.

FIG. 5 and FIG. 6 show the measurement results at that time, wherein FIG. 5 is a view showing the relation between the rate of amplitude of pulsation of the air flow and the rate of change of the air flow rate, and FIG. 6 is a view showing the waveform of the air flow rate at a rate of amplitude of 1.

The condition of the pulsating air flow at the time of the measurements is that the frequency of pulsation was 62.5 Hz, and the average flow rate of air in the main passage was 30 g/s.

As can be seen from FIG. 5, the flow rate average value in this first embodiment increased as compared with the prior art example. (For example, at a rate of amplitude of 1, it increased by 20% and 10% in the first embodiment and in the prior art example, respectively, more than the average flow rate in the main passage.)

That is, it is found that the increase of the flow rate in the auxiliary passage with respect to the flow rate in the main passage is greater in the first embodiment than in the prior art example, and hence the auxiliary passage of the first embodiment functions better than that of the prior art example does.

Also, it is found from FIG. 6 that the amplitude of pulsation in the first embodiment decreased as compared with that in the prior art example.

From this, it is understood that the inconvenience caused by using the thermo-sensitive resistance element 13, i.e., the average value of the flow rate detection signal of the thermo-sensitive resistance element 13 becoming smaller than the actual flow rate, is obviated. To this end, it is necessary to increase the length of the auxiliary passage 14 greater than that of the main passage 3, but the amount of increase and hence the length of the auxiliary passage 14 can be made shorter in the first embodiment than in the prior art example, thus making it possible to reduce the entire size of the device.

Furthermore, the entire rear surface of the circuit module 2 is exposed to air, so that the circuit module 2 can be cooled in an efficient manner even if the temperature of the circuit module 2 itself is raised due to the heat from the connector 9 side and/or the self heating of the electronic parts 12. As a result, the temperature of the circuit module 2 substantially coincides with the temperature of the intake air in the main passage 3, and hence the influence of the heat on the thermo-sensitive resistance element 13 is substantially reduced, whereby accuracy in the measurement of the air flow rate can be improved.

Embodiment 2.

Figure 7:
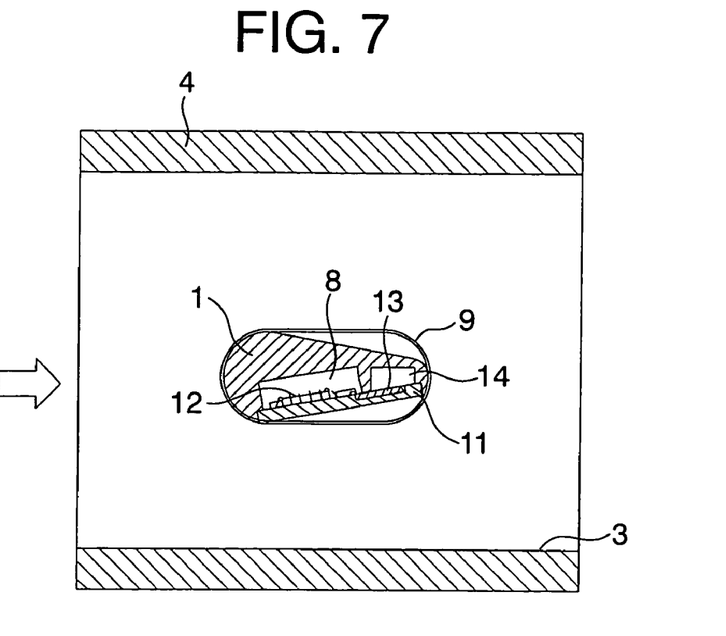
FIG. 7 is a cross sectional view of essential portions showing an air flow rate measuring device according to a second embodiment of the present invention.

FIG. 7 is a cross sectional view of essential portions showing an air flow rate measuring device according to a second embodiment of the present invention.

In this second embodiment, the one or upstream end of the base 1, at which the support substrate 11 and the base 1 are joined to each other in a face-to-face relation, takes a curved surface configuration when sectioned along the axial direction thereof vertically with respect to the support substrate 11. Also, the other or downstream end of the base 1, at which the support substrate 11 and the base 1 are joined to each other in a face-to-face relation, similarly takes a curved surface configuration when sectioned along the axial direction thereof vertically with respect to the support substrate 11. In addition, though the support substrate 11 and the base 1 are joined to each other in a face-to-face relation, their cross-sectional shapes are symmetric with respect to the central axis thereof.

The construction of this second embodiment other than the above is similar to that of the first embodiment.

According to the air flow rate measuring device of this second embodiment, the entire cross sectional configuration of the support substrate 11 and the base 1 is in the shape of a streamline (raindrop), so that air resistance can be reduced in comparison with the first embodiment, and air can flow smoothly from an inlet portion of the auxiliary passage 14 into the auxiliary passage 14 and also can flow out smoothly from an output portion thereof, thus making it possible to improve the accuracy of measurements as well as reduce the pressure loss.

Figure 8:
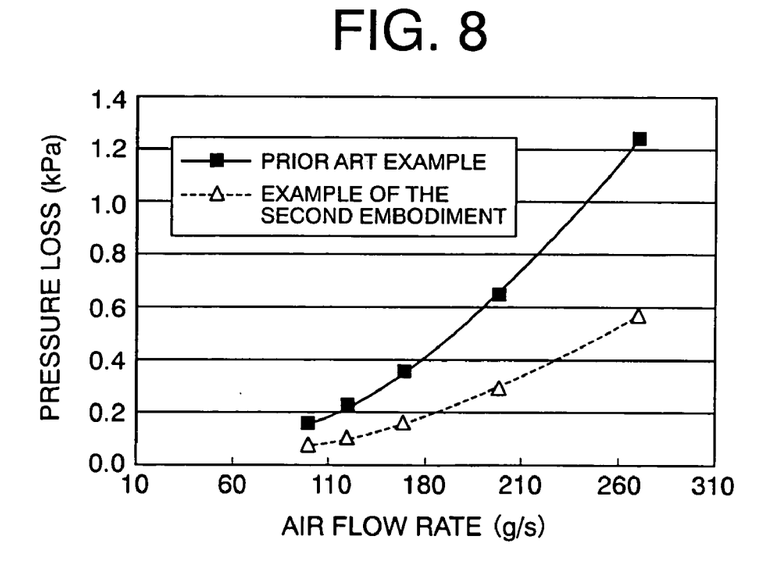
FIG. 8 is a pressure loss characteristic chart of the air flow rate measuring device according to the second embodiment of the present invention.
Figure 9:
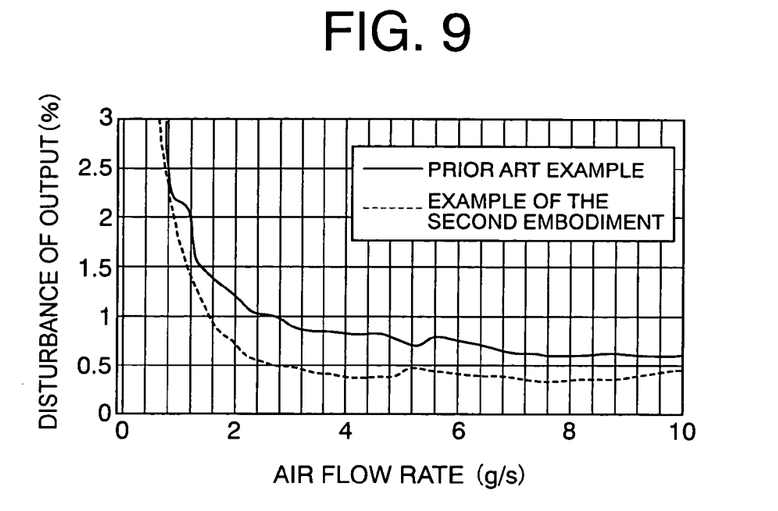
FIG. 9 is an output characteristic chart in the air flow rate measuring device according to the second embodiment of the present invention.

FIG. 8 is a pressure loss characteristic chart obtained by the inventor through experiments, and FIG. 9 is an output characteristic chart similarly obtained by the inventor through experiments.

FIG. 8 and FIG. 9 are views obtained by a comparison between the second embodiment and the above-mentioned prior art example.

It is found from FIG. 8 that the pressure loss in the second embodiment is about ½ in comparison with that in the prior art example, and it is also found from FIG. 9 that the stability of the output in a low flow rate range in the second embodiment is about ½ in comparison with that in the prior art example.

Embodiment 3.

Figure 10:
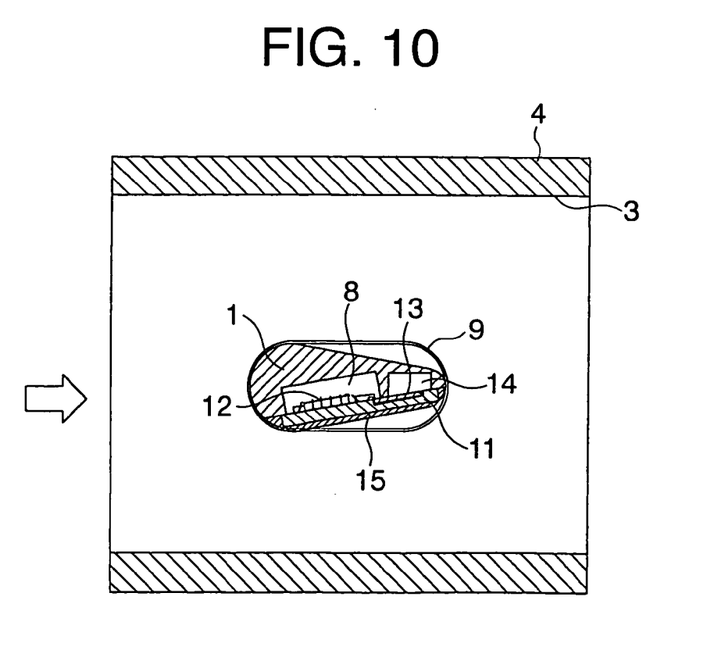
FIG. 10 is a cross sectional view of essential portions showing an air flow rate measuring device according to a third embodiment of the present invention.

FIG. 10 is a cross sectional view of essential portions showing an air flow rate measuring device according to a third embodiment of the present invention.

In this third embodiment, a cover 15 is arranged at the other side of the support substrate 11 (at a side opposite the thermal resistance element 13) for covering the other side of the support substrate 11. This cover 15 is made of PBT (polybutylene phthalate) for example.

In this third embodiment, the one or upstream end of the base 1, at which the support substrate 11 with the cover 15 attached thereto and the base 1 are joined to each other in a face-to-face relation, takes a curved surface configuration when sectioned along the axial direction thereof vertically with respect to the support substrate 11. Also, the other or downstream end of the base 1, at which the support substrate 11 with the cover 15 attached thereto and the base 1 are joined to each other in a face-to-face relation, similarly takes a curved surface configuration when sectioned along the axial direction thereof vertically with respect to the support substrate 11. In addition, though the support substrate 11 with the cover 15 attached thereto and the base 1 are joined to each other in a face-to-face relation, their cross-sectional shapes are symmetric with respect to the central axis thereof.

The construction of this third embodiment other than the above is similar to that of the first embodiment.

According to this air flow rate measuring device, the advantageous effects as obtained by the second embodiment can be achieved, In addition, since the cover 15 is made of a resin material, the streamline shape of those portions of the air flow rate measuring device which are arranged in the main passage 3 is easily formed in comparison with the one of the second embodiment.

Here, note that in the above-mentioned second and third embodiments, the downstream end of the base 1, at which the support substrate 11 and the base 1 are joined to each other, is in the shape of a curved surface configuration, but if the upstream end alone is shaped into a curved surface configuration, the pressure loss can of course be reduced.

In addition, although in the first through third embodiments, there has been described the case in which the thermo-sensitive resistance element is used as a detection element, the present invention is not of course limited to such a case, but any type of detection element can be used as long as it is able to detect the flow rate of air.

While the invention has been described in terms of preferred embodiments, those skilled in the art will recognize that the invention can be practiced with modifications within the spirit and scope of the appended claims.

What is claimed is:

1. An air flow rate measuring device adapted to be mounted on an intake pipe of an internal combustion engine for measuring a flow rate of air flowing through a main passage inside the intake pipe, said device comprising:
- a base having its one end directed along an axial direction of said main passage toward an upstream side of air flowing therein, and its other end directed toward a downstream side of the air, said base being formed with a groove which is bent at a location between the opposite ends thereof; and
- a circuit module including a support substrate and a detection element installed one surface of said support substrate for detecting said flow rate of air, said module being joined to said base in a face-to-face relation with respect to each other to form an auxiliary passage in cooperation with said groove;

wherein said detection element on said one surface of said support substrate is exposed to air in said auxiliary passage, and the other surface of said support substrate is exposed to air in said main passage.

2. The air flow rate measuring device as set forth in claim 1, wherein said detection element is disposed in a concave portion of said support substrate so as to be flush with said one surface of said support substrate.

3. The air flow rate measuring device as set forth in claim 1, wherein said one end of said base, which is disposed at said upstream side of air and at which said support substrate and said base are joined to each other, takes a curved surface configuration when sectioned along the axial direction thereof vertically with respect to said support substrate.

4. The air flow rate measuring device as set forth in claim 3, wherein said other end of said base, which is disposed at said downstream side of air and at which said support substrate and said base are joined to each other, takes a curved surface configuration when sectioned along the axial direction thereof vertically with respect to said support substrate, and has a cross-sectional shape symmetric with respect to a central axis thereof.

5. The air flow rate measuring device as set forth in claim 1, wherein a cover for covering said other surface of said support substrate is attached to said other surface of said support substrate, and said one end of said base, which is disposed at said upstream side of air and at which said support substrate with said cover attached thereto and said base are joined to each other, takes a curved surface configuration when sectioned along the axial direction thereof vertically with respect to said support substrate.

* * * * *